United States Patent [19]

Coste

[11] 4,323,895
[45] Apr. 6, 1982

[54] DISPLAY DEVICE FOR DASHBOARD OF AUTOMOBILE

[75] Inventor: Jean C. Coste, Marly le Roi, France

[73] Assignee: Regie Nationale des Usines Renault, Boulogne-Billancourt, France

[21] Appl. No.: 143,489

[22] Filed: Apr. 24, 1980

[30] Foreign Application Priority Data

May 11, 1979 [FR] France .................... 79 12073

[51] Int. Cl.³ .......................................... G09G 3/00
[52] U.S. Cl. ................................. 340/782; 340/62; 340/825.77
[58] Field of Search ................... 340/160, 161, 782

[56] References Cited

U.S. PATENT DOCUMENTS 4,183,021 1/1980 Gerstner ................. 340/782 X

FOREIGN PATENT DOCUMENTS 52-67522 6/1977 Japan .................... 340/782

OTHER PUBLICATIONS

IBM Tech. Discl. Bul., "Electroluminescent Display", R. W. Landauer, vol. 8, No. 11, Apr. 1966, pp. 1569-1570.

Primary Examiner—David L. Trafton
Attorney, Agent, or Firm—Oblon, Fisher, Spivak, McClelland & Maier

[57] ABSTRACT

A display device, e.g. for dashboard of automobile, of the type having indicator lights, e.g. electroluminescent diodes driven by power conductors, including n parallel power conductors, with n any whole number at least equal to two, between which, with the conductors taken in pairs, are connected anode-to-cathode two parallel electroluminescent diodes, and means for supplying each of the conductors with three different drive signals, i.e. a high voltage state, a low voltage state, and a high impedance state.

5 Claims, 4 Drawing Figures

DISPLAY DEVICE FOR DASHBOARD OF AUTOMOBILE

BACKGROUND OF THE INVENTION

1. Field of the Invention

This invention relates to improvements in automotive dashboard displays.

2. Description of the Prior Art

Use of indicators and monitoring devices on the dashboards of automobiles is known where a graduated dial is provided with a series of indicator lights facing all or part of the graduations, with the light, illuminated at a given moment, providing the driver, for example, with information regarding the speed of the vehicle. As indicator lights, it is known to use electroluminescent diodes connected with a number of connection wires at least as great as the number of diodes provided on the dial. However, with the continuous development of electrical and electronic equipment in vehicles, there has arisen the serious problem of the proliferation of electrical conductors forming bundles for which space can no longer be found.

SUMMARY OF THE INVENTION

Accordingly, the objects of this invention are to provide a novel automotive dashboard display remedying the above-noted problem and requiring fewer conductors for display control.

These and other objects are achieved by providing a novel automotive dashboard display including a means of supplying $n(n-1)$ electroluminescent diodes with only n conductors, with n being any whole number other than zero.

According to the present invention, the display device, e.g. for an automobile dashboard of the type consisting of indicator lights such as, e.g. electroluminescent diodes and power conductors, includes n power conductors in parallel, with n being any whole number equal to or greater than two, between which, with said conductors taken in pairs, two parallel electroluminescent diodes are connected anode-to-cathode, and means for supplying each conductor with three different voltage states: high state, low state, and high impedance state.

According to a first embodiment, the means for supplying each conductor the three different voltage states comprises: for each conductor, a series connection between a positive voltage source, a resistance, the collector-emitter terminals of two successive transistors, and ground, the common point of the transistors being connected to the conductor to be supplied, and the bases thereof each being connected to a variable control voltage source through a series resistance.

According to a preferred embodiment, the means for supplying each conductor the three different voltage states comprise, for each conductor: a series connection of two "3-state" adapters, the common point of which is connected to the conductor to be supplied.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
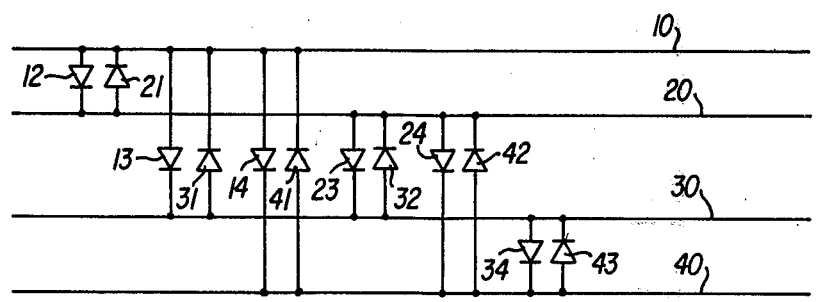
FIG. 1 is a circuit diagram representing the manner in which a group of twelve electroluminescent diodes is supplied according to the present invention from four main conductors.

Referring now to the drawings, wherein like reference numerals designate identical or corresponding parts throughout the several views, and more particularly to FIG. 1 thereof, there is shown four conductors in parallel referred to as 10, 20, 30, 40. Between these conductors, taken in pairs, two electroluminescent diodes are parallel connected, anode-to-cathode, as follows:

between conductors 10 and 20: diodes 12 and 21;
between conductors 10 and 30: diodes 13 and 31;
between conductors 10 and 40: diodes 14 and 41;
between conductors 20 and 30: diodes 23 and 32;
between conductors 20 and 40: diodes 24 and 42;
between conductors 30 and 40: diodes 34 and 43.

To assume that conductors 10, 20, 30, 40 can be supplied with three-state control signals, i.e. high-state, low-state and high impedance state, for controlling an electroluminescent diode, requires a high state line, a low state line, and two high impedance lines. Thus, if line 10 is in high state, line 20 is in low state, and lines 30 and 40 are in high impedance state, electroluminescent diode 12 is illuminated and all others are off.

Figure 2:
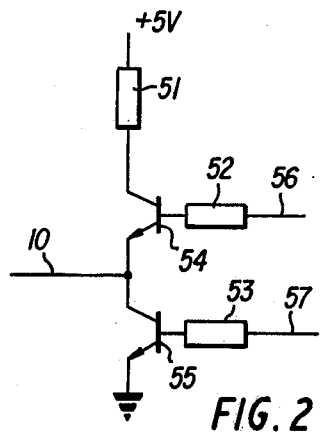
FIG. 2 is a circuit diagram of a first embodiment, enabling communication of a given state, chosen from three possible states, to each of the above main conductors.

FIG. 2 illustrates a first means of constructing a three-state line, e.g. over conductor 10 of FIG. 1. To this end, between 5-volts positive and ground is placed a circuit comprising the following in series: a resistance 51, the collector-emitter portion of a first transistor 54, a junction point 15 with conductor 10 and the collector-emitter portion of a second transistor 55. The base of first transistor 54 is connected to a variable control voltage source 56 through resistance 52 and the base of second transistor 55 is likewise connected to a second variable voltage source 57 through resistance 53. The presence of resistance 51 has the purpose of limiting the value of the current into thhe electroluminescent diodes to a value which can be tolerated. Resistances 52 and 53 limit in the same way the value of the current on the bases of transistors 54 and 55.

It is clear to the man skilled in the art that:

if voltages 56 and 57 are zero, conductor 10 is in the high impedance state;

if voltage 56 is zero and voltage 57 is equal to one, conductor 10 is in the low voltage state;

if voltage 56 is equal to one and voltage 57 is zero, conductor 10 is in the high voltage state.

Since each of conductors 10, 20, 30, 40 from FIG. 1 is equipped with a circuit similar to that illustrated in FIG. 2, then by controlling voltages 56 and 57 with the aid of an appropriate logic circuit, it can be seen that a means has been shown for placing each of said conductors into the desired state, selected from among three states: high state, low state and high impedance state, and that consequently it is possible to illuminate the desired diode from among the twelve electroluminescent diodes of FIG. 1 simply by acting upon the state of conductors 10, 20, 30 and 40.

Figure 3:
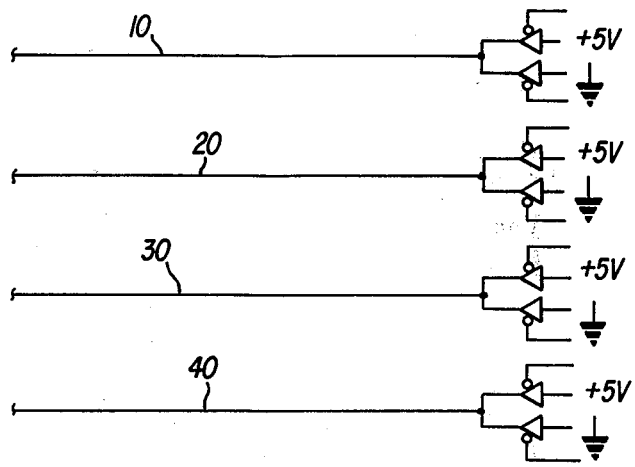
FIG. 3 is a circuit diagram illustrating in its entirety a preferred embodiment according to the present invention of the main conductor supply system of FIG. 1.

FIG. 3 illustrates a second preferred embodiment according to which the transistors of FIG. 2 are replaced with "three state" adapters, e.g. amplifier circuits of the 74 125 type from the Texas Instruments catalog.

Figure 4:
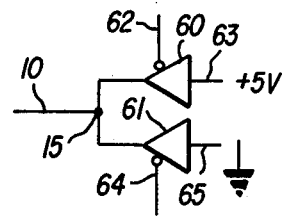
FIG. 4 is an enlarged circuit diagram illustrating the supply system for each conductor of FIG. 3, according to the preferred embodiment.

FIG. 4 illustrates in enlarged form the details of the power circuit associated, e.g., with conductor 10. It will be seen that two "three state" adapters 60 and 61 replace two transistors 54 and 55 of FIG. 2.

Considering a single gate 60 with its three associated conductors 62, 63 and 10:

if conductor 62 is in a high voltage state, conductor 10 is in a high impedance state;

if conductor 62 is in a low voltage state, conductor 10 is in a high voltage state if conductor 63 is in a high voltage state, and conductor 10 is in a low voltage state if conductor 63 is in a low voltage state.

Considering now the whole of FIG. 4, it can be deduced that:

conductor 10 is in a high impedance state if conductors 62 and 64 are in the high voltage state;

conductor 10 is in the high voltage state if conductor 62 is in the low voltage state and conductor 64 is in the high voltage state;

conductor 10 is in the low voltage state if conductor 62 is in the high voltage state and conductor 64 is in the low voltage state.

In the embodiment of the invention, conductor 63 of gate 60 may be led to positive 5 volts and conductor 65, corresponding to gate 61, to ground, as shown in FIG. 4. In this latter configuration, FIG. 3 represents the set of conductors 10, 20, 30, 40 for supplying the electroluminescent diodes, and the associated power circuits each consist of two three-state gates.

With the power circuits as shown in FIG. 4, the current which enters the electroluminescent diode which one wishes to illuminate is on the order of 22 mA.

To vary the luminosity of the electroluminescent diodes, one may:

either modulate control signal 62 for line 10 by varying the duty cycle ratio;

or by inserting a series resistance on the lines.

In this way, a savings on the order of 66% is made in the total number of electrical conductors necessary for use of the display device.

Obviously, numerous modifications and variations of the present invention are possible in light of the above teachings. It is therefore to be understood that within the scope of the appended Claims, the invention may be practiced otherwise than as specifically described herein.

What is claimed as new and desired to be secured by Letters Patent of the United States is:

1. A display device comprising:
   plural electroluminescent diode pairs, the diodes of each diode pair parallel connected anode-cathode;
   n parallel power conductors (n>2), connected to said plural diode pairs with only one diode pair connected between any two respective power conductors; and
   means for selectively supplying each of the conductors with a high voltage state, a low voltage state or a high impedance state;
   wherein for each conductor said selectively supplying means comprises:
   a series connection between a positive voltage source and ground of,
   a resistor
   a pair of transistors connected between said resistor and ground, the collector and emitter portions of said transistors being series connected at a common point coupled to a respective conductor, and each transistor having a base connected to a respective control voltage source through a respective base resistor.

2. A display device according to claim 1, wherein for each conductor said selectively supplying means comprises:
   a series connection between a positive voltage source and ground of,
   a resistor
   a pair of transistors connected between said resistor and ground, the collector and emitter portions of said transistors being series connected at a common point coupled to a respective conductor, and each transistor having a base connected to a respective control voltage source through a respective base resistor.

3. A display device according to claim 1, wherein for each conductor said selectively supplying means comprises:
   a pair of series connected tri-state drivers, said drivers having a common point connected to a respective conductor to be supplied.

4. A display device comprising:
   at least three electroluminiscent diode pairs, the diodes of each diode pair parallel connected anode-to-cathode;
   at least three parallel power conductors connected to said at least three diode pairs with only one diode pair connected between any two respective power conductors, said at least three diode pairs being delta connected with two of the at least three diode pairs series connected between the at least three parallel power conductors and a third of the at least three diode pairs connected in parallel across the at least two series connected diode pairs; and
   means for selectively supplying each of the conductors with a high voltage state, a low voltage state or a high impedance state whereby any one of the diodes of the at least three diode pairs can be selectively activated to the exclusion of the other diodes of said at least three diode pairs.

5. A display device according to claim 4, comprising:
   n parallel power conductors, wherein n>3; and
   (n) (n−1) diodes arranged in pairs parallel connected anode-to-cathode and connected to said n parallel power conductors with only one diode pair connected between any two respective power conductors.

* * * * *